April 13, 1965 R. B. STANLEY 3,178,571
APPARATUS AND METHOD FOR DETERMINING BEARING
CONDITION OF RAILWAY CAR JOURNAL BOXES
Original Filed June 8, 1959 5 Sheets-Sheet 4
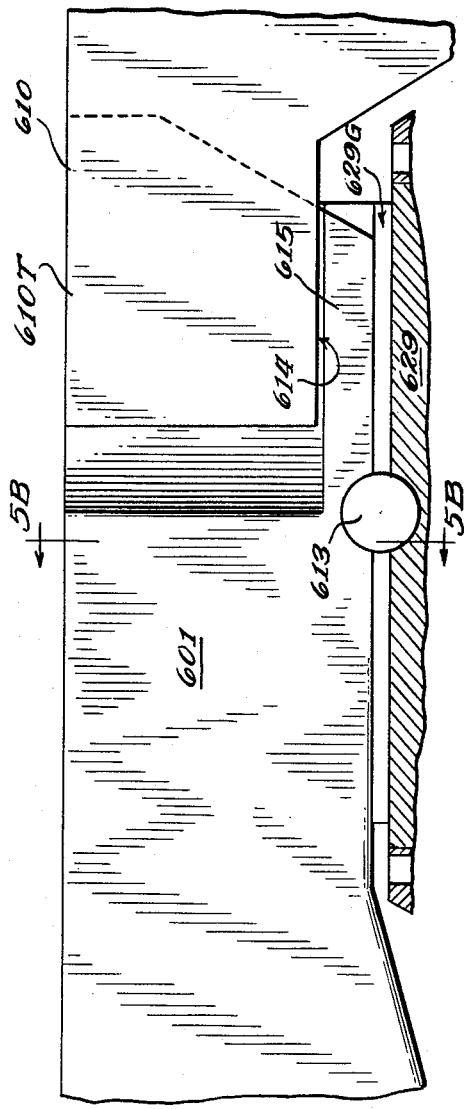
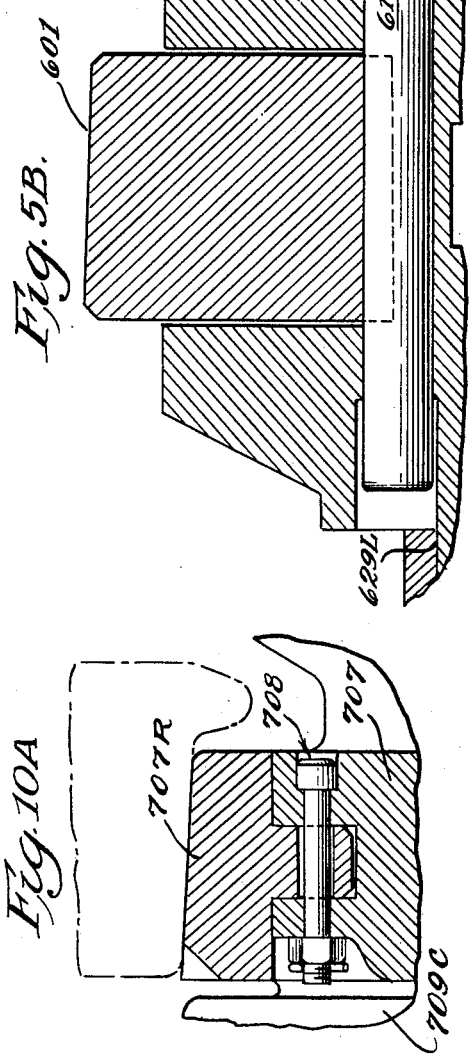
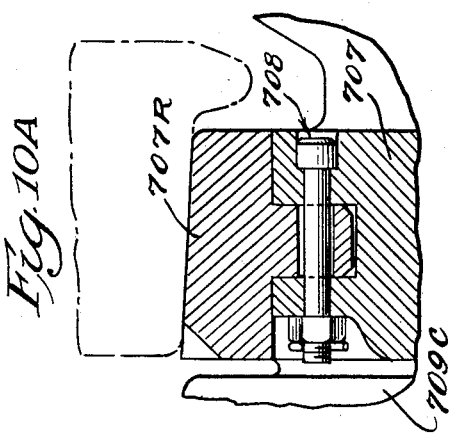
Inventor
Richard B. Stanley
By Mann Brown + McWilliams Attys.

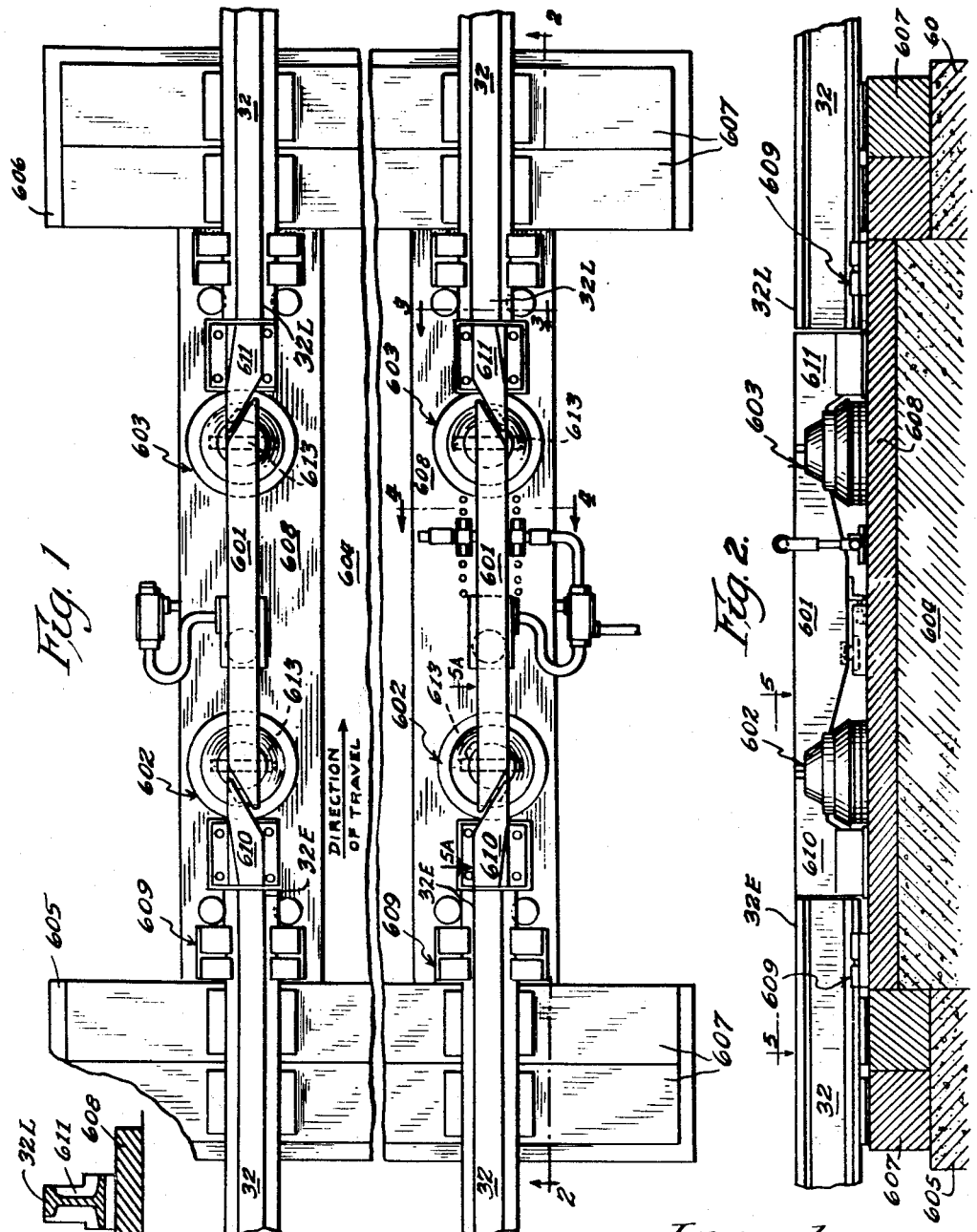

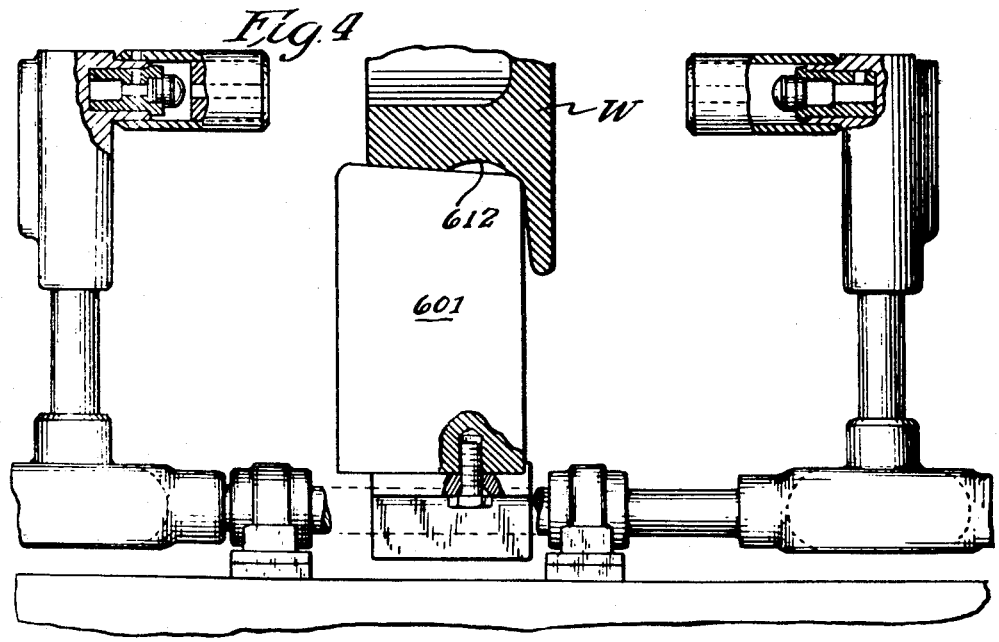
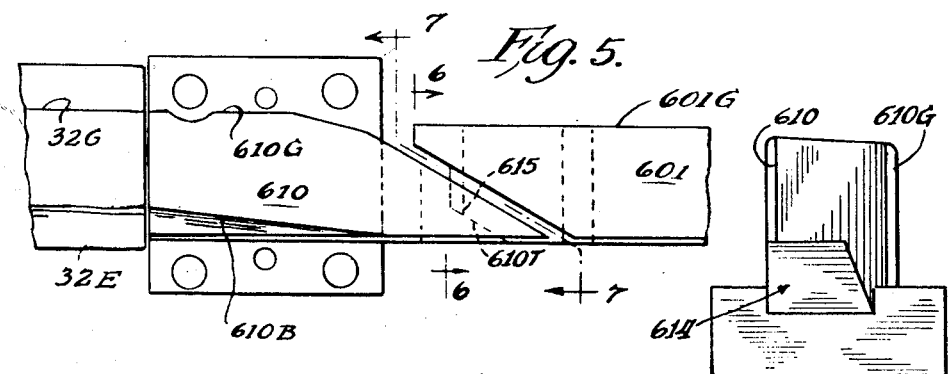
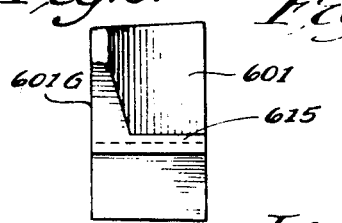

United States Patent Office 3,178,571
Patented Apr. 13, 1965

3,178,571
APPARATUS AND METHOD FOR DETERMINING BEARING CONDITION OF RAILWAY CAR JOURNAL BOXES
Richard B. Stanley, Park Ridge, Ill., assignor to Free-Roll Tester Corporation, a corporation of Illinois
Original application June 8, 1959, Ser. No. 818,857. Divided and this application Jan. 10, 1963, Ser. No. 250,575
5 Claims. (Cl. 246—246)

This application is a division of my pending application Serial No. 818,857 filed June 8, 1959, and granted on December 31, 1963, as U.S. Patent No. 3,116,044.

This invention is concerned with test track apparatus wherein a test rail is mounted in a cutout section of a regular running rail, so as to support the wheel of a car traversing the section.

In the aforesaid pending application the test rail functions in a device employed for measuring the ratio of the drag force exerted by the wheel to the weight force exerted by the wheel. This ratio gives a measurement of the free-rolling ability of the wheel. It will be apparent that the test rail may be employed in related equipment, such as may be used for measuring drag forces only or weight forces only.

For such applications it is important that the test rail support the car wheel in a free-rolling relationship. For example, wheel flange friction introduces objectionable extraneous forces. Similarly, flat spots on the wheel tread introduce objectionable forces.

Moreover, it is important that the transition of the car wheel from the regular running rail onto the test rail be as smooth and gradual as possible, and it is important to eliminate extreme shock applications such as can occur upon the transfer of heavy dynamic loads. The presence of undesired shock forces may impair the effectiveness of the measuring equipment that senses the response of the test rail, and in some circumstances may disrupt the test rail mounting and cause severe mechanical damage to the entire installation.

Accordingly, the principal object of the invention is the provision of test track apparatus for facilitating the support of railway car wheels rolling over a test rail.

Another object of the invention is the provision of apparatus for facilitating the transfer of the railway car wheels from the regular running rail to the test rail.

Other objects and advantages of the present invention will become apparent as the description proceeds.

Figure 8:
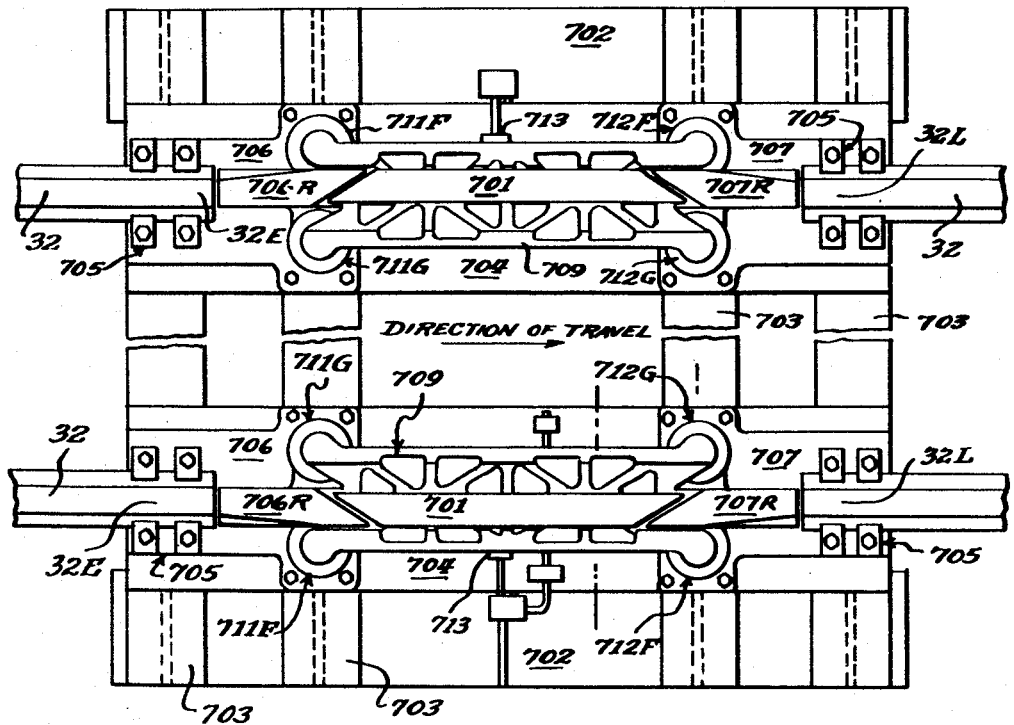
Figure 9:
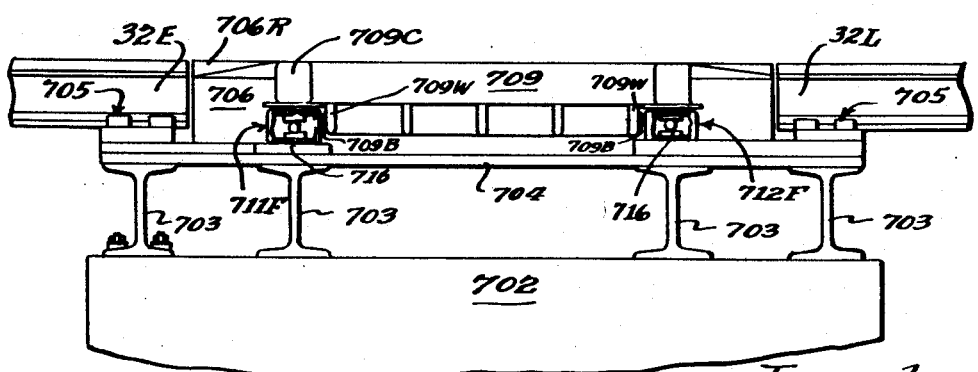
Figure 10:
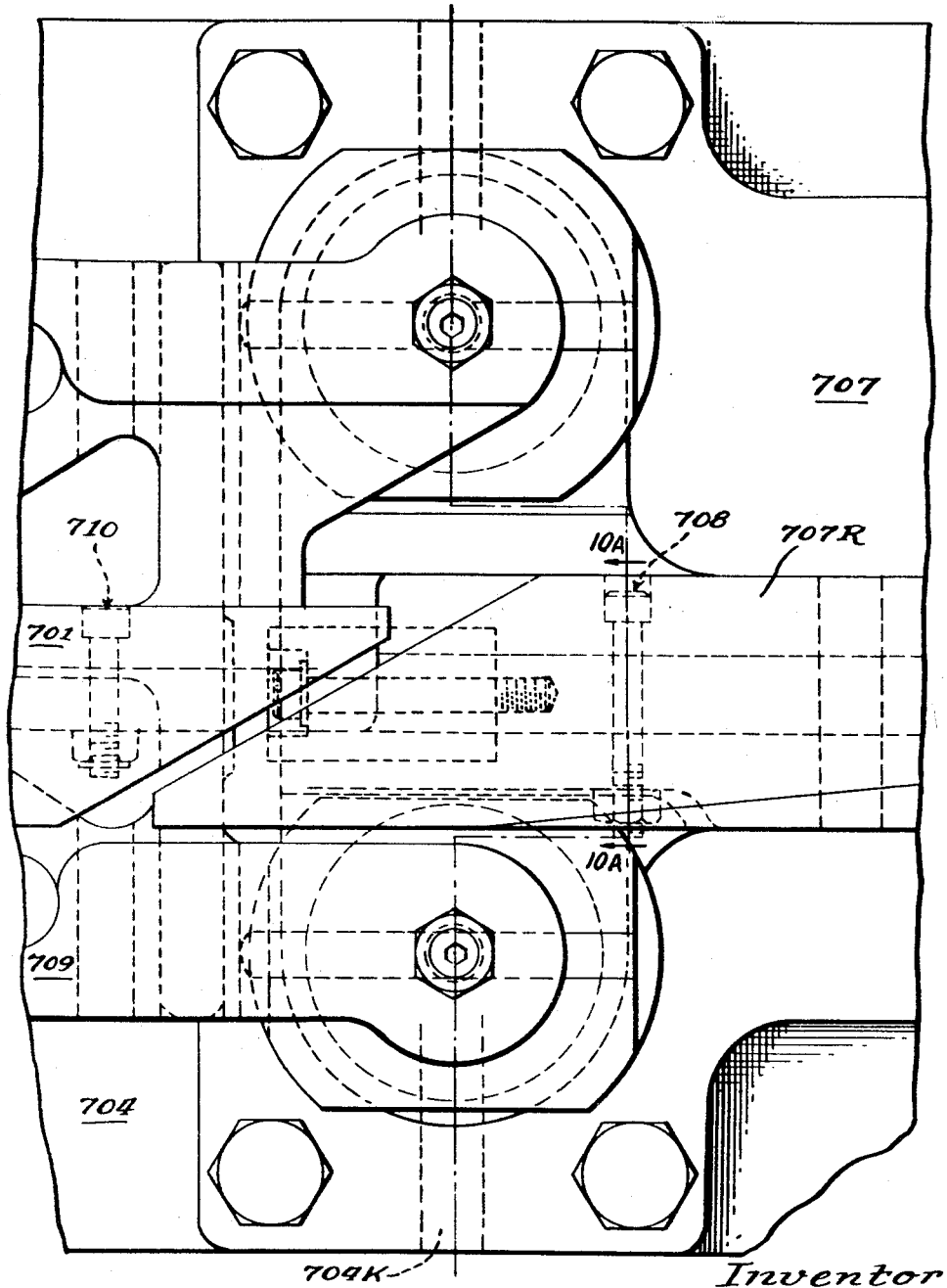

In the accompanying drawings FIG. 1 is a top plan view of a test track layout embodying a test rail arrangement in accordance with this invention; FIG. 2 is a side-sectional view taken approximately in the vertical plane of line 2—2 of FIG. 1; FIG. 3 is a transverse sectional view of one of the track rails and is taken approximately in a vertical plane of line 3—3 of FIG. 1; FIG. 4 is a transverse sectional view through one of the test rails and is taken approximately in the vertical plane of line 4—4 of FIG. 1; FIG. 5 is an enlarged fragmentary top plan view of the transfer block and the adjoining ends of the track and test rails and is taken as indicated at the line 5—5 shown in FIG. 2; FIG. 5A is a fragmentary side elevational view taken as indicated at the line 5A—5A of FIG. 1; FIG. 5B is a fragmentary sectional view taken at the line 5B—5B of FIG. 5A; FIGS. 6 and 7 are end views of the adjacent end faces of the test rail and transfer block as viewed along the lines of 6—6 and 7—7 respectively of FIG. 5; FIG. 8 is a top plan view of apparatus representing another test track layout incorporating an arrangement in accordance with this invention; FIG. 9 is a side-elevational view of the apparatus of FIG. 8 with portions of the structure broken away and sectioned; FIG. 10 is an enlarged fragmentary top plan view illustrating the mounting relationship of the transfer block and test rails; and FIG. 10A is a fragmentary sectional view taken at the line 10A—10A of FIG. 10.

One test track layout incorporating the invention is shown in FIGS. 1 to 7. In this form, the test rails 601 are mounted on individual inclined-plane type roller bearing pods adjacent their opposite ends to support each test rail for movement lengthwise along the trackway. The direction of travel of the cars over this apparatus is shown by the center arrow in FIG. 1, with the entering bearing pods designated generally at 602 and the leaving bearing pods designated generally at 603. In these trackway installations, a section of the tracks 32 and roadbed is removed and a concrete foundation is poured in the vacated section. As is apparent in FIGS. 1 and 2, the foundation arrangement comprises a main support pad 604 that projects above the level of the roadbed and entering and leaving concrete support pads 605 and 606, respectively, extending transversely along the opposite lengthwise ends of the main pad. A pair of cross ties 607 of the usual form is fixedly supported on each end pad.

For each test rail, a separate massive metal block or slab 608 is anchored to the main concrete pad 604 to extend along the line of the rail, with all of the stationary structural members associated with the test installation being firmly anchored to the metal slabs to establish and retain them in a permanent and accurate positional relationship. Thus the entering and leaving ends 32E and 32L, respectively, of the regular running rails are terminated and secured in accurately spaced positions on the opposite lengthwise ends of the metal slabs with suitable clamping facilities, as indicated generally at 609, securing these ends to the metal slabs. Similarly, the entering and leaving transfer blocks 610 and 611, respectively, and the bearing pods themselves are firmly bolted to the metal slabs in adjacent alignment with the ends of the running rails.

As is best seen in FIGS. 1-7, there is specific advantage in the particular track layout and rail configurations disclosed for transferring the car wheels to and from the test rails and for supporting the car wheels while riding on the test rails.

The gauge spacing of the terminal ends of the running rails 32 and the transfer blocks 610 and 611 is accurately fixed so that the car wheels are properly centered immediately as they enter upon the test rails. The massive and rigid foundation structure and associated anchoring slabs ensure that the desired spacing relationships will be maintained against loads and shocks of normal usage. It will be seen from a consideration of FIG. 5 that the flange or gauge edge 601G of each of the test rails is offset outwardly from the gauge edges 610G and 32G of the associated transfer block and running rail to provide increased gauge spacing between the test rails 601 for ensuring clearance of the wheel flanges while the car wheels are riding on the test rails. Thus the possibility of flange friction exerting a drastically increased drag upon the test rails is eliminated, and distorted measurements of the drag-to-weight characteristics of the bearings that support the car wheels are also eliminated.

In addition, the running surfaces or treads of the transfer blocks and test rails are wider than that of conventional rail by an amount sufficient to eliminate overhang of the outer edge of the wheel rim or tread, as is made more clear from a consideration of FIG. 4, which illustrates a car wheel W with its flange immediately adjacent the gauge edge of the test rail while the outer edge of the wheel rim is well within the outer edge of the test rail. It will also be apparent from a consideration of FIGS. 4, 6 and 7 that both the test rail and the transfer block are canted at an angle of 2° fifty-six minutes to match the angle of taper of new car wheels and provide a smooth ride for new car wheels while the wide tread which eliminates overhang permits old and badly worn wheels to ride on their outer rims and develop a proper rolling motion along the test rails even where the car wheel may have a highly developed flat-spot condition, such as is indicated at 612 in FIG. 4. Any time that a wheel is permitted to ride on a flat-spot region, it develops a sliding or dragging action that would seriously impair measurement of the drag-to-weight characteristics of the bearing, and this could lead to numerous false indications. It should be noted that in FIG. 4 the wheel is shown with its flange closely adjacent the gauge edge of the test rail to illustrate that even in the worst possible condition the rim of the wheel cannot overhang the field edge of its test rail. In actual practice, however, as mentioned hereinbefore, the spacing of the test rails would normally preclude the car wheels from assuming this extreme position.

It will be appreciated that a lengthwise gap is required between the transfer blocks and the movable test rails to accommodate free movement of the test rails, and special provisions are made herein to facilitate transfer of the car wheel from the stationary entering transfer block 610 to the movable test rail 601 and then to the stationary leaving transfer block 611.

As is best seen in FIG. 5, the adjacent ends of a transfer block and test rail are provided with complementally tapered, side-by-side, lengthwise overlapping running surfaces so that at all points of its travel the car wheel is actually supported on a rail and thus is never required to jump across an open space. This arrangement affords a smooth transition and is desirable not only from the standpoint of minimizing wear and tear on the equipment but also from the standpoint of avoiding the setting up in the system of error-producing extraneous shock forces. While such forces are short-lived, in some instances they may persist into and through the actual test interval. This is another source of false indications that is eliminated by the present arrangement. The transfer blocks are bevelled upwardly along their field edge in a direction extending towards the test rail (see bevel line 610B in FIG. 5) to provide a smooth transition for car wheels that tend to ride on these outer rims.

A further feature in the rail arrangement of this embodiment resides in the fact that the adjacent ends of the transfer blocks and test rails are arranged to provide a vertical interlock for preventing the test rail from tipping up when the car wheel immediately enters or leaves it. Each end of each test rail is mounted on a single pin bearing 613 (see FIGS. 5A and 5B) spaced a slight distance from the end of the rail so that as a car wheel first enters upon the test rail, its weight, acting on the extreme end of the test rail, swings it upwardly about the pivot point defined by the adjacent pin bearing. To guard against this, the lower part of the pointed end of the transfer block is relieved or recessed, as indicated by the arrow at 614 in FIG. 5A, to receive an abutment shoulder in the form of a laterally projecting under-surface provided on the end of the test rail, as indicated at 615 in FIG. 5B. As is best seen in FIGS. 5 and 5A, the tip end 610T of the transfer block 610 overhangs the abutment shoulder 615 on the test rail 601 to block upward tipping movement of the test rail.

It should also be noted that the development of tipping of the test rail is avoided at least to some extent by virtue of the side-by-side, lengthwise overlapping arrangement of the tip ends of the transfer block and test rail. As the car wheel is riding over the region of overlap, its tendency to depress the tip end of the test rail is limited so long as it is able to ride with its outer rim on the tip of the transfer block. Thus, at the point of transition from a transfer block to a test rail or vice versa, vertical tipping of the test rail is resisted in two respects: the transfer block at the unengaged end of the test rail opposes upward movement by virtue of the vertical interlock while the transfer block at the engaged end of the test rail opposes downward movement at this end by partially supporting the car wheel as it rides over the extreme end of the test rail.

Another embodiment of the invention is shown in FIGS. 8–10. In this form, each test rail 701 is mounted for independent movement lengthwise along the trackway. The direction of travel of cars traversing this apparatus is indicated by the center arrow in FIG. 8. In this trackway installation, a section of each track 32 and its roadbed is removed and a separate concrete footing 702 is poured along the line of each of the removed sections of track rail. As is apparent in FIGS. 8 and 9, a number of I-beams 703 are anchored to the concrete footings 702 and are positioned to extend transversely of the trackway to provide a firm base structure for the apparatus.

For each test rail a separate elongated metal plate or slab 704 is anchored to the I-beams and extends underneath and along the line of the rail, with all of the stationary structural members associated with the test apparatus being firmly anchored to the metal slabs to establish and retain an accurate positional relationship therebetween. Thus, the entering and leaving ends 32E and 32L, respectively, of the conventional running rails are terminated and secured in accurately spaced positions on opposite ends of the slabs with suitable clamping facilities, as indicated generally at 705, anchoring the rail ends to the slabs. Similarly the entering and leaving transfer blocks or castings 706 and 707, respectively, are firmly bolted to the metal slabs 704 in accurate alignment with the ends of the running rails.

In the present arrangement, the transfer rails 706R and 707R are preferably separate from the transfer castings and are mounted in accurate alignment therein through locating key-and-slot arrangements that are interlocked by suitable fasteners indicated generally at 708 in FIGS. 10 and 10A. Similarly, the test rail 701 is mounted in a separate test-rail cradle or casting 709 and is located in accurate alignment therein by a suitable locating key-and-slot arrangement that is interlocked by suitable fasteners indicated generally at 710 in FIG. 10. The test-rail cradle is arranged for movement as a unit with its test rail, and each cradle is supported at each of its four corners on separate bearing pod assemblies that are housed in the transfer castings and disposed in rectangular spatial relation. In the case of each test rail, two pods are provided adjacent the entering end of the test rail and are designated generally as 711G and 711F, respectively, to represent that one is located on the gauge side of the test rail and the other is located on the field side of the test rail. Similarly, two bearing pods are provided adjacent the leaving end of the test rail and are designated 712G and 712F.

It should be understood that the test rail 701 and transfer rails 706R and 707R have the same general layout and configurations as respects the wide rail, laterally offset test rail construction and the interlocking, overlapping rail end constructions as do the test rail 601 and transfer rails or blocks 610 and 611 of the embodiment shown in FIGS. 1–7.

Thus, there is provision for resisting tipping of the test rail; however, in the embodiment of FIG. 8 it will be noted that the bearing pods are located beyond the maximum extension of the test rail itself and therefore as the car wheel transfers from the entering transfer rail 706R to the test rail 701, it is at a position to load the test rail casting at a point that is intermediate the entering and leaving bearing pods and there is no tendency for the test rail to tip. The same is true at the leaving end of the test rail. Thus, with the disclosed arrangement, the test rail is stable against tipping in its vertical plane. At both the entering and leaving ends, the bearing pods are arranged on opposite sides of the test rail to make the test rail stable against tipping or turning about the longitudinal axis of the rail.

It should be understood that the description of these preferred embodiments of the invention is for the purpose of complying with Section 112, Title 35, of the U.S. Code and that the appended claims should be construed as broadly as the prior art will permit.

I claim:

1. A test track installation comprising a pair of test rails, and means for supporting said test rails between and in general lengthwise alignment with entering and leaving ends of conventional track rails of given gauge spacing for cooperably supporting a unitary wheel pair of a railway car to respond to the forces exerted by the wheel pair as it rolls freely thereover, with the test rails having a gauge spacing sufficiently greater than said given spacing to insure wheel flange clearance as the wheel pair rides thereon and having wider running surfaces than the conventional rails, with the running surface of each test rail having a cant complemental to the cant of the running surface of a car wheel.

2. In a track layout wherein a cooperating pair of test rails is interposed between lengthwise spaced apart entering and leaving ends of conventional running rails having a given gauge spacing for cooperably supporting a unitary wheel pair of a railway car to respond to the forces exerted by the wheel pair when rolling freely thereover, and entering and leaving transfer blocks are interposed between the ends of the running rails and test rails; the improvement wherein said test rails have a gauge spacing sufficiently greater than said given spacing to insure flange clearance for the wheel pair as it rides on the test rails wherein the transfer blocks and test rails have lengthwise overlapping complemental tapered ends separated by a lengthwise gap facilitating the transfer of car wheels riding thereon while accommodating limited lengthwise movement of the test rails.

3. Test track apparatus interposed between and in general lengthwise alignment with the entering and leaving ends of conventional track rails for testing the rolling characteristics of a unitary wheel pair of a railway car, said conventional rails having a given gauge spacing, said apparatus comprising movable test rails for cooperably supporting the wheel pair in free rolling relation thereon, with the test rails having a gauge spacing sufficiently greater than said given spacing to insure wheel flange clearance as the wheel pair rides thereon and having wider running surfaces than the conventional rails, with the running surface of each test rail having a cant complemental to the cant of the running surface of a car wheel, entering and leaving transfer blocks interposed between the ends of the conventional rails and the test rails, with the transfer blocks and test rails having lengthwise overlapping complemental tapered ends separated by a lengthwise gap facilitating the transfer of car wheels riding thereon while accommodating limited lengthwise movement of the test rails, with the tapered end of each transfer block having a recess in a lower portion thereof and with each tapered end of the test rails having a laterally projecting under-surface extending within said recess and defining an abutment shoulder for engagement with the transfer block to resist upward movement of the test rail end.

4. Test track apparatus interposed between and in general lengthwise alignment with the lengthwise spaced apart entering and leaving ends of a track rail and comprising a movable test rail for supporting a railway car wheel in free rolling relation thereon, and including independent means supporting the test rail at its entering and leaving ends, said means each including lower structure having an upper surface at each side of the associated test rail end, with said upper surfaces extending in parallel directions corresponding generally to the lengthwise direction of the test rail, upper structure rigid with said test rail and having lower surfaces corresponding to and overlying said upper surfaces, and means between said upper and lower surfaces supporting said upper structure for free movement along said upper surfaces.

5. The apparatus of claim 4 wherein the upper surfaces of said lower structure are located beyond the corresponding ends of said test rail and the lower surfaces of said upper structure are located beyond the corresponding ends of said test rail such that the test rail applies weight forces to all of said upper surfaces during the entire travel of said wheel thereover.

References Cited by the Examiner

UNITED STATES PATENTS

| 283,632 | 8/83 | Merrill | 238—174 |
| 412,260 | 10/89 | Jenks | 238—288 |
| 1,186,737 | 6/16 | Bohannan | 238—274 X |
| 1,206,710 | 11/16 | Jackson | 238—232 |
| 1,563,466 | 12/25 | Bujol | 238—288 |
| 2,127,403 | 8/38 | Grosser | 238—288 |
| 2,305,843 | 12/42 | Chagnon | 238—230 |
| 2,574,474 | 11/51 | Gieskieng | 246—246 |
| 3,085,642 | 4/63 | Raskin | 177—134 |

FOREIGN PATENTS 462,637 2/50 Italy.

EUGENE G. BOTZ, *Primary Examiner.*

JAMES S. SHANK, LEO QUACKENBUSH,
*Examiners.*